(12) United States Patent
Zauritz

(10) Patent No.: US 10,293,778 B2
(45) Date of Patent: May 21, 2019

(54) FRONTAL AIRBAG, FRONTAL AIRBAG MODULE AND MOTOR VEHICLE

(71) Applicant: AUTOLIV DEVELOPMENT AB, Vargarda (SE)

(72) Inventor: Ralf Zauritz, Holzkirchen (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 23 days.

(21) Appl. No.: 15/652,612

(22) Filed: Jul. 18, 2017

(65) Prior Publication Data

US 2018/0022307 A1   Jan. 25, 2018

(30) Foreign Application Priority Data

Jul. 19, 2016 (DE) .................... 10 2016 113 254

(51) Int. Cl.
*B60R 21/2338* (2011.01)
*B60R 21/205* (2011.01)
(Continued)

(52) U.S. Cl.
CPC ........ *B60R 21/2338* (2013.01); *B60R 21/205* (2013.01); *B60R 21/231* (2013.01);
(Continued)

(58) Field of Classification Search
CPC .. B60R 21/2338; B60R 21/231; B60R 21/205
See application file for complete search history.

(56) References Cited

U.S. PATENT DOCUMENTS

| 7,862,082 B2 * | 1/2011 | Thomas | ............... B60R 21/2346 |
| | | | 280/729 |
| 2003/0168842 A1 * | 9/2003 | Igawa | ................... B60R 21/233 |
| | | | 280/743.2 |

(Continued)

FOREIGN PATENT DOCUMENTS

JP         2008044594 A  *  2/2008  ........... B60R 21/233

OTHER PUBLICATIONS

Kazuaki Bito, Airbag Device, Feb. 28, 2008, JPO, JP 2008-044594 A, Machine Translation of Description (Year: 2008).*

(Continued)

*Primary Examiner* — James A English
(74) *Attorney, Agent, or Firm* — Brinks Gilson & Lione

(57) ABSTRACT

A frontal airbag (10) having an outer skin (12) enclosing a gas space (G). The outer skin (12) forming an impact area (14) in front a vehicle occupant (P) and extends horizontally in a first direction (Y) and in a second perpendicular direction (Z') when the airbag (10) is fully deployed. A first tether (20) extends in the first direction (Y) from a first end (21) connected to the impact area (14) at a first connection (25) to a second end (22) connected to the impact area (14) at a second connection (26). The first connection (25) extending in the second direction (Z') from a lower end to an upper end and the second connection (24) extending in the second direction (Z') from a lower end to an upper end, such that an intermediate impact area section (14*c*) is spanned by the first tether (20). The first tether (20) is under tension when the outer skin (12) is fully deployed such that the tension in the intermediate section (14*c*) of the impact area (14) is reduced relative to impact area sections (14*a*, 14*b*) next to the intermediate section (14*c*).

17 Claims, 8 Drawing Sheets

(51) Int. Cl.
*B60R 21/231* (2011.01)
*B60R 21/00* (2006.01)

(52) U.S. Cl.
CPC ............... *B60R 2021/0004* (2013.01); *B60R 2021/0023* (2013.01); *B60R 2021/0048* (2013.01); *B60R 2021/23382* (2013.01)

(56) References Cited

U.S. PATENT DOCUMENTS

| | | | |
|---|---|---|---|
| 2007/0205591 A1* | 9/2007 | Bito | B60R 21/233 280/743.2 |
| 2008/0174094 A1* | 7/2008 | Bito | B60R 21/2338 280/739 |
| 2009/0115176 A1* | 5/2009 | Reiter | B60R 21/231 280/743.2 |
| 2011/0062693 A1* | 3/2011 | Williams | B60R 21/2338 280/743.2 |

OTHER PUBLICATIONS

Kazuaki Bito, Airbag Device, Feb. 28, 2008, JPO, JP 2008-044594 A, English Abstract (Year: 2008).*

* cited by examiner

FRONTAL AIRBAG, FRONTAL AIRBAG MODULE AND MOTOR VEHICLE

CROSS-REFERENCE TO RELATED APPLICATION

This application claims the benefit of priority to German Patent Application Serial No.: DE 10 2016 113 254.3, filed Jul. 19, 2016, the content of which is incorporated herein by reference in its entirety.

FIELD OF THE INVENTION

The invention relates to a frontal airbag for installation into a motor vehicle, an airbag module with such a frontal airbag, and a motor vehicle having such a module.

BACKGROUND

Frontal airbags are widespread in today's automotive technology. They are the first kind of airbags introduced into the automotive technology and are still key elements of the safety system of a motor vehicle especially of passenger cars. The use of frontal impact airbags saves thousands of lives every year.

Although the present invention can be applied to both, to so-called driver airbags deploying in front of the steering wheel of the motor vehicle as well as to so-called passenger airbags deploying in front of a part of the instrument panel, reference is primary made to passenger airbags since the most relevant application for the current invention are passenger airbags. But it needs to be noted that the invention can also be applied to so-called driver airbags.

The task of a frontal airbag is to protect the head and the thorax of the person sitting in front of this frontal airbag. In case of a "pure" frontal crash (meaning that the vehicle hits another object symmetrically with its front, the deceleration of the car occurs only in the travelling direction of the car (denoted as the X-direction). This is the most often case of a frontal crash and consequently frontal airbags are optimised for this case. In this load case the person hits the impact area of the frontal airbag in a simple linear motion such that no significant lateral forces act between the frontal airbag and the person. The situation changes in the case of a laterally offset frontal crash. This is explained as follows by means of the case in which reference is made to a left-hand driven car.

It happens relatively often that the car hits an object (especially another car driving in the opposite direction) with its front left edge. This leads to a motion of the person(s) sitting in the vehicle to the front and to the left (relative to the vehicle). For the passenger sitting next to the driver, this means that she/he moves forward and to the inside (away from the right side window). A typical angle of movement is 20°. This can lead to the following: when the head of the passenger hits the impact area of the frontal airbag the head is held by the same because of frictional forces, but the body of the passenger continues to move towards the inside of the car. This can lead to a very quick rotation of the head and/or to high forces in the neck of the passenger. Both can have negative consequences.

It is the task of the invention to provide a frontal airbag for providing improved protection of the person to be protected during a laterally offset frontal crash.

This task is solved by a frontal airbag a module with such a frontal airbag, and a vehicle with such a module as described herein.

A feature of the present invention is to provide a first tether which is connected to the impact area of the outer skin of the frontal airbag along two connections which are spaced from each other in the transverse direction of the vehicle (referred to as the first direction). This first tether and the two connections preferably extend along a substantial part of the height of the impact area such that a section of the impact area (referred to as the intermediate section) is spanned over by this first tether. This first tether is under tension when the airbag is fully deployed because the first tether is (in the first direction) shorter than the intermediate section and/or because the presence of a second tether connecting the first tether to another part of the airbag or to the housing of the airbag module. Due to the tension in the first tether, the tension in the section of the frontal airbag which is spanned over by the first tether (the intermediate section) is reduced at least in the first direction, such that a "soft cell" is created which allows a movement of the head in the first direction after the head hit the impact area. This leads to less rotational forces on the head and to lower forces applied to the neck.

Since in the case of a laterally offset crash the head usually hits the impact area offset of its center, the intermediate section (soft cell) is preferably also offset from the center.

In order to ensure that the impact area, or a part of the same "follows" the passenger along a substantial time of restraining process, it can be further preferred that the whole airbag is able to rotate in the horizontal plane along its connection to the housing.

BRIEF DESCRIPTION OF THE DRAWINGS

The invention will now be described in detail by means of preferred embodiments in view of the drawings. The drawings show.

DETAILED DESCRIPTION OF THE DRAWINGS

Figure 1:
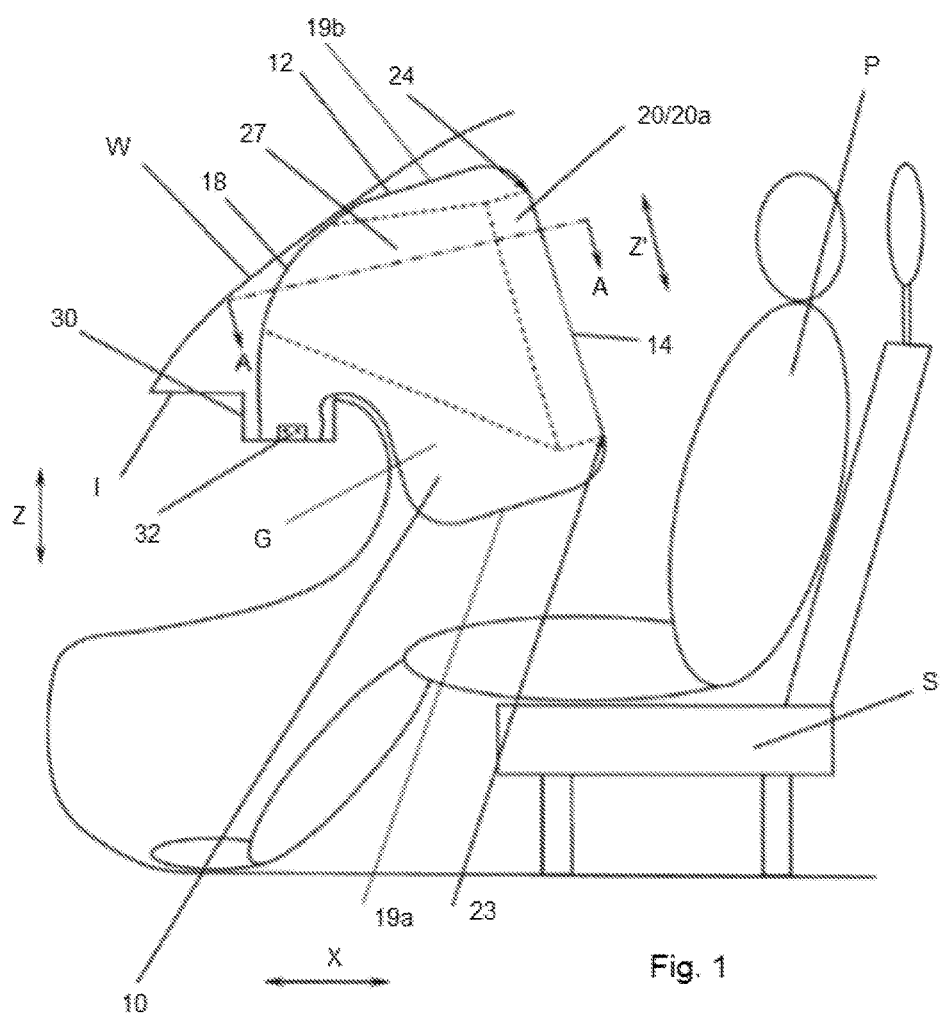
FIG. 1 is a schematic side view of the passenger side of a motor vehicle with a fully deployed passenger frontal airbag according to a first embodiment.

A first embodiment of the invention will now be described in detail in view of FIGS. 1 and 2. FIG. 1 shows the passenger side of a left-hand driven vehicle in a side view from the driver side. One can see the passenger seat S with a passenger P (or dummy) sitting on it. The instrument panel I and the windscreen W are located in front of this passenger P. A housing 30 is mounted to the instrument panel and an inflator 32 is attached to the housing in such a way that the inflator 32 is in fluid connection to the gas space G of a frontal airbag 10 which is folded into the housing 32 when it is not deployed. FIG. 1 shows the state in which this frontal airbag is fully deployed, meaning that its outer skin 12, which encloses the gas space G, is filled with inflation gas. The frontal airbag 10 includes the just mentioned outer skin 12 and two tethers; namely, a first tether 20 and a second tether 27 which are drawn in dashed lines in FIG. 1, since the tethers 20, 27 are inside the outer skin 12.

The structure of the frontal airbag 10 will now be described with reference to FIGS. 1 and 2, with FIG. 2 being a sectional view taken along line A-A in FIG. 1. As has already been noted, the tethers 20, 27 are drawn in dashed lines in FIG. 1, and in order to distinguish these tethers 20, 27 better from the outer skin 12, they are drawn in thinner lines than the outer skin 12 in FIG. 2.

The frontal airbag 10 (meaning its outer skin 12) expands in all three dimensions X, Y, Z. The following definitions apply: the first direction (also referred to as Y direction) is the transverse direction of the vehicle. The Z direction is the vertical direction; and the X direction is the longitudinal direction of the vehicle.

The outer skin 12 of the frontal airbag 10 can be looked at as being basically formed of an impact area 14 being positioned in front of the passenger P, two side areas 16a, 16b with the first side area 16a at the inner side of the vehicle compartment and the second side area 16b at the outer side of the passenger compartment (next to the side window), a windshield side area 18 which is located adjacent to the windshield W, a lower area 19a, and an upper area 19b.

According to the above definitions, the impact area 14 extends horizontally in the first direction (Y direction) and perpendicular to this in a second direction Z'. Usually the impact area is slanted towards the front of the vehicle, so the direction Z' is in most cases not identical to the Z direction.

Figure 2:
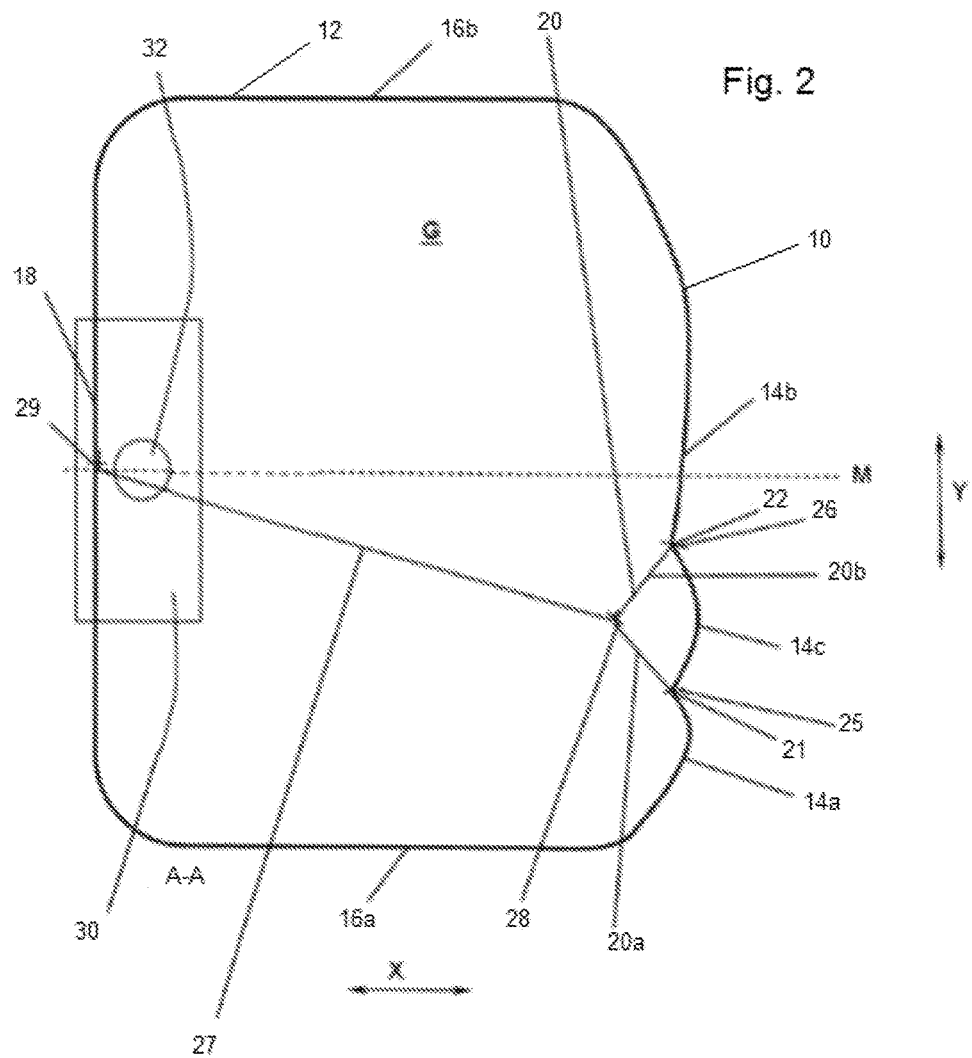
FIG. 2 is a sectional view taken along line A-A in FIG. 1, also in a schematic representation.

As can best be seen from FIG. 2 with further taking into account FIG. 1, the first tether 20 is attached to the inner side of the impact area 14. This first tether 20 extends in the first direction Y from a first end 21 to a second end 22, with both ends being connected to the impact area 14 by a connection, usually in the form of a seam. The connection connecting the first end 21 is denoted as the first connection 25, and the connection connecting the second end 22 is denoted as second connection 26. In the second direction Z', this first tether 20 extends from a lower end 23 to an upper end 24. The connections 25, 26 do of course also each extend from a lower end to an upper end. In the described embodiment the two connections are equally long, which is preferred. It is further preferred that this first tether 20 extends substantially along the complete height (meaning the extension in the second direction Z') of the impact area 14 as is shown in FIG. 1. It is further preferred that the first connection 20a and the second connection 20b are parallel to one another with a distance between 10 and 30 cm. The first tether 20 spans over a section of the impact area 14, which is referred to as the intermediate section 14c.

A second tether 27 extends from the first tether 20 to a remote part of the outer skin 12 (here to the windshield side area 18) or (not shown in the drawings) to the housing 30. This second tether 27 is connected to the first tether 20 by an inter-tether connection 28 and to the outer skin by a skin-tether connection 29.

The second tether 27 divides the first tether 20 into two sections, namely the first tether section 20a adjacent to the first end and a second tether section 20b adjacent to the second end 22. The terms first tether and second tether are to be understood structurally and not necessarily physically. In the embodiment shown, first tether 20 and second tether 27 are made of separate tether elements, but the two tethers could also be made of one piece by a one-piece-woven technique, or one tether element could form the second tether 27 and the first tether section 20a of the first tether 10 and another tether element could form the second tether section 20b of the first tether 20 (or vice versa).

As can best be seen from FIG. 2, the first tether 20 and the second tether 27 are under tension when the outer skin 12 is fully deployed. Because of this the first tether 20 divides the impact area 14 into an inner side section 14a at the inner side of the vehicle, an outer side section 14b at the outer side of the vehicle, and the intermediate section 14c located therebetween. As can clearly be seen from FIG. 2, this intermediate section 14c is offset of the middle M of the outer skin 12 and thus also offset of the middle of the impact area 14. In the embodiment of FIG. 2, the skin-tether connection 29 is located in the center of the windscreen side area 18, such that the second tether extends along a slant relative to the X direction.

Because of the tension inside the tethers 20, 27, the depth of the outer skin 12 is slightly reduced along the two connections 25, 26 leading to a reduced tension in the intermediate section 14c in relation to the inner side section 14a and the outer side section 14b especially in the Y direction (first direction). So, a "soft cell" extending in first direction Y and in second direction Z' is created. This soft cell has basically the shape of a section of a cylinder surface. It is important to understand that this "relative softness" has nothing to do with a reduced gas pressure (which is basically the same all over the gas space G) when the airbag is in a fully deployed state, but only with a reduced tension inside the outer skin 12. It is further important to understand that the reduced tension in the soft cell is not isotropic: the intermediate section (soft cell) is generally softer (meaning easier to deform) in the first direction Y than in the second direction Z'.

When a typical offset frontal crash occurs meaning that (in the case of a left-handed driven car) the left front corner of the vehicle hits another object (mostly another vehicle) the head of the passenger P moves typically with a 20 degree angle towards the impact area 14. The position of the intermediate section 14c is (depending on the car geometry and the depth of the outer skin 12) chosen such that the head hits this intermediate section 14c. Because of the relative softness of the intermediate section 14c especially in the first direction Y, the head can still move a little bit into the second direction even after hitting the impact area 14, such that the deceleration in the first direction Y is slower than in the case of a standard frontal airbag. This decreased deceleration leads to reduced load to a neck of the passenger P and to a slower head rotation. Both helps to avoid serious injuries.

In case of a pure frontal crash, the head of the occupant hits the outer side section 14b such that the frontal airbag 10 gives the protection of a standard frontal airbag.

Figure 3:
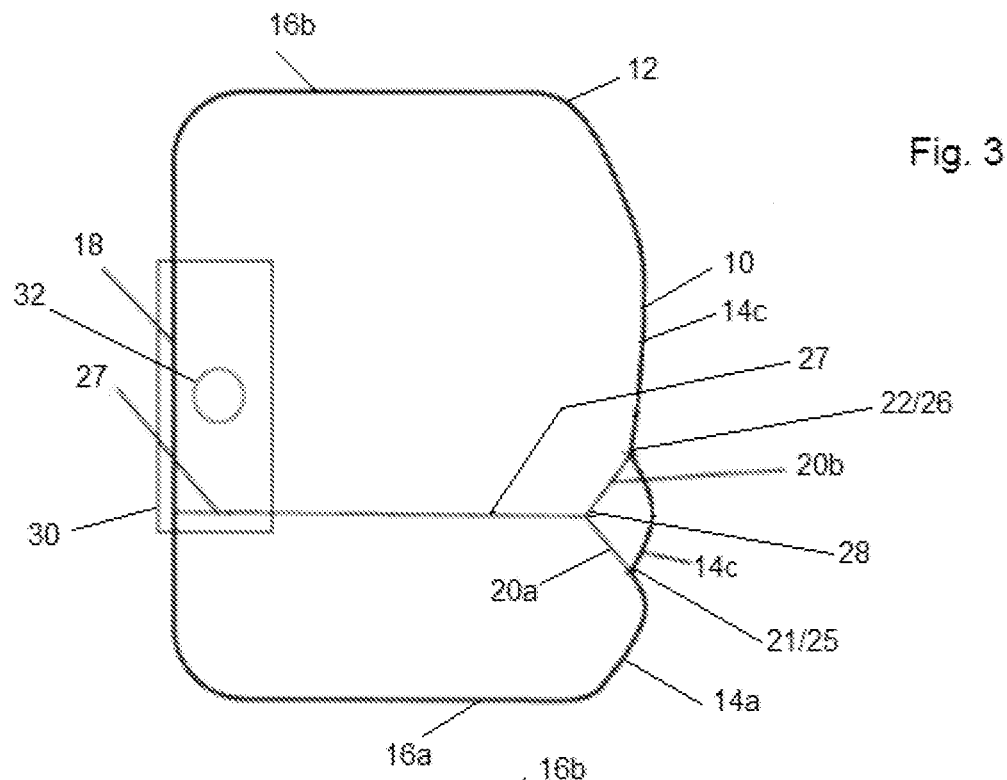
FIG. 3 shows a variation of the first embodiment in a representation according to FIG. 2.

FIG. 3 shows a variation of the embodiment shown in FIGS. 1 and 2. The difference is that the second tether 27 extends basically parallel to the longitudinal direction of the vehicle (X direction). The connection between the tethers and the connection between the second tether and the outer skin is not explicitly shown in this Figure.

Figure 4:
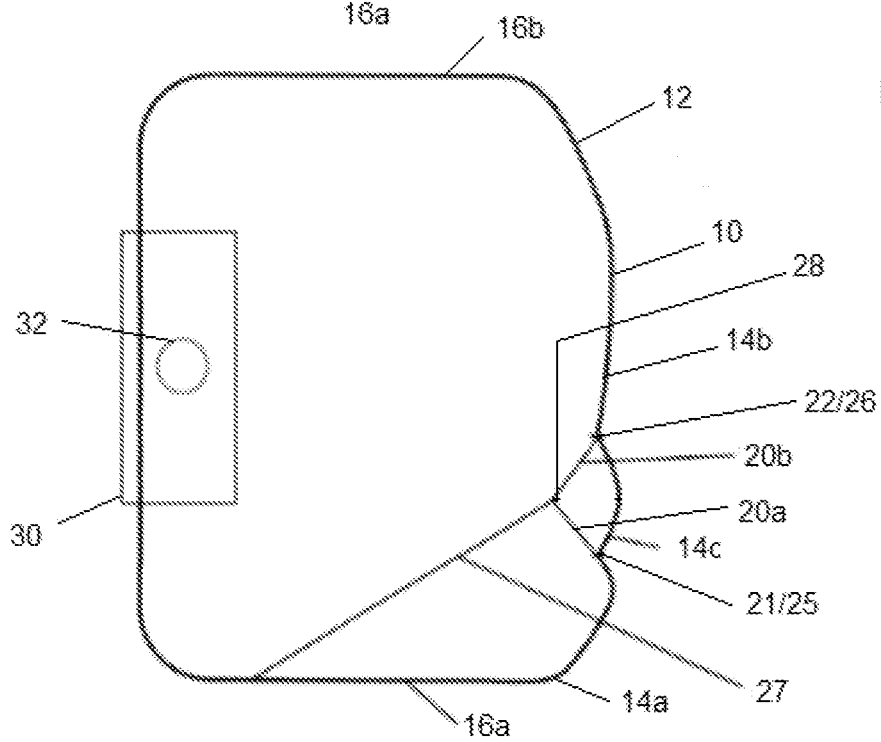
FIG. 4 shows a further variation in a representation according to FIG. 3.

FIG. 4 shows another variation of the first embodiment. Here the second tether 27 is connected to a side area of the outer skin.

As has already been mentioned, the second tether could also be connected to a part of the housing 30, but usually it is preferred to connect the second tether to a part of the outer skin of the frontal airbag 10.

Figure 5:
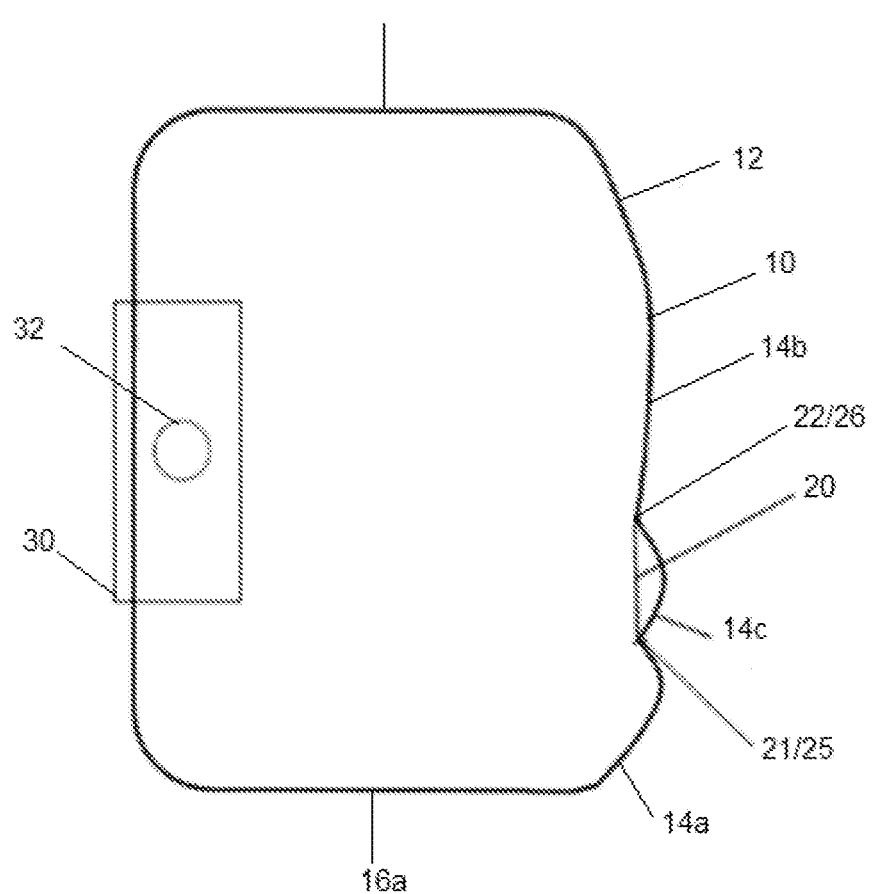
FIG. 5 shows a second embodiment of the invention in a representation according to FIG. 2.

FIG. 5 shows a second embodiment. In this embodiment, the first tether 10 is basically formed as the first tether of the first embodiment meaning that it extends over a substantial height (Z' direction) of the impact area 14 of the outer skin 12. In contrast to the first embodiment, no second tether 27 is present. The width of the first tether 20 between its first end 21 and its second end 22 (meaning between the first connection 25 and the second connection 26) is less than the width of the intermediate area 14c in the Y direction. So, the same effect as in the first embodiment is achieved; namely, that the tension in Y direction is reduced in the intermediate area 14c relative to the tension in the side sections 14a, 14b, although the same gas pressure is applied to this section.

Figure 6:
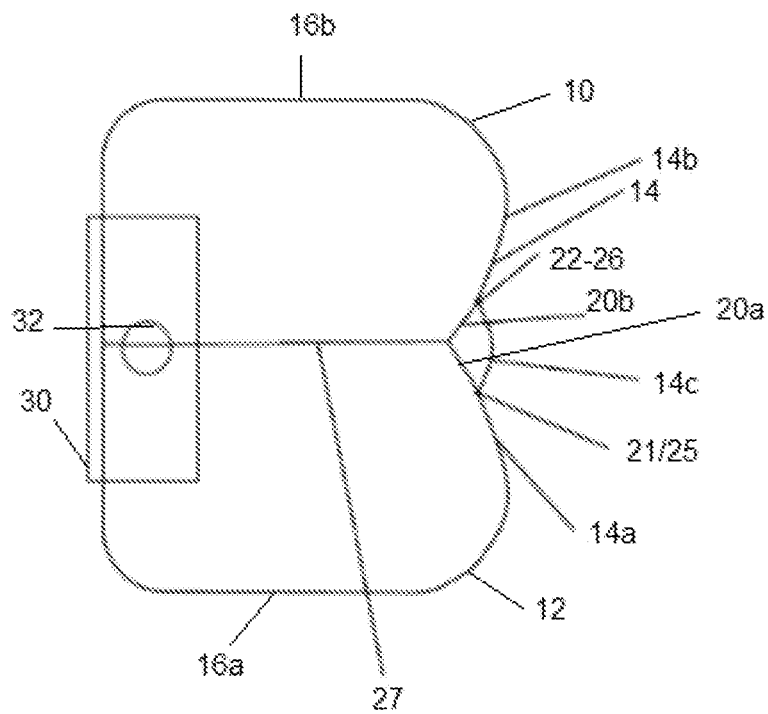
FIG. 6 shows an embodiment similar to the one of FIG. 2 in a representation according to FIG. 2.
Figure 7:
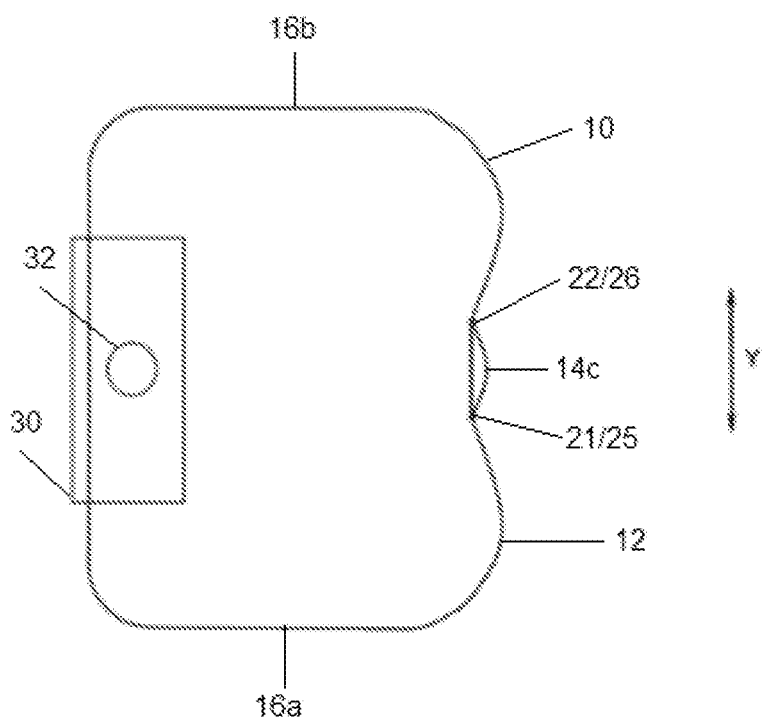
FIG. 7 shows an embodiment similar to embodiment of FIG. 5 in a representation according to FIG. 5.

To locate the intermediate area 14c offset from the middle towards the inside of the vehicle (to the left in case of a left-hand driven car, to the right in the case of a right-hand driven car in case of a passenger airbag) is an important application of this invention, but it needs to be mentioned, that the technique of creating a "soft cell" could also be applied to symmetric arrangements (see FIGS. 6 and 7) or to applications where it is desired to have such a soft cell on the outer side of the vehicle (not shown in the drawings). Such a soft cell is in any case useful when it is desired that the head of an occupant can move to some extend in the first (transverse) direction after hitting the impact area.

Figure 8:
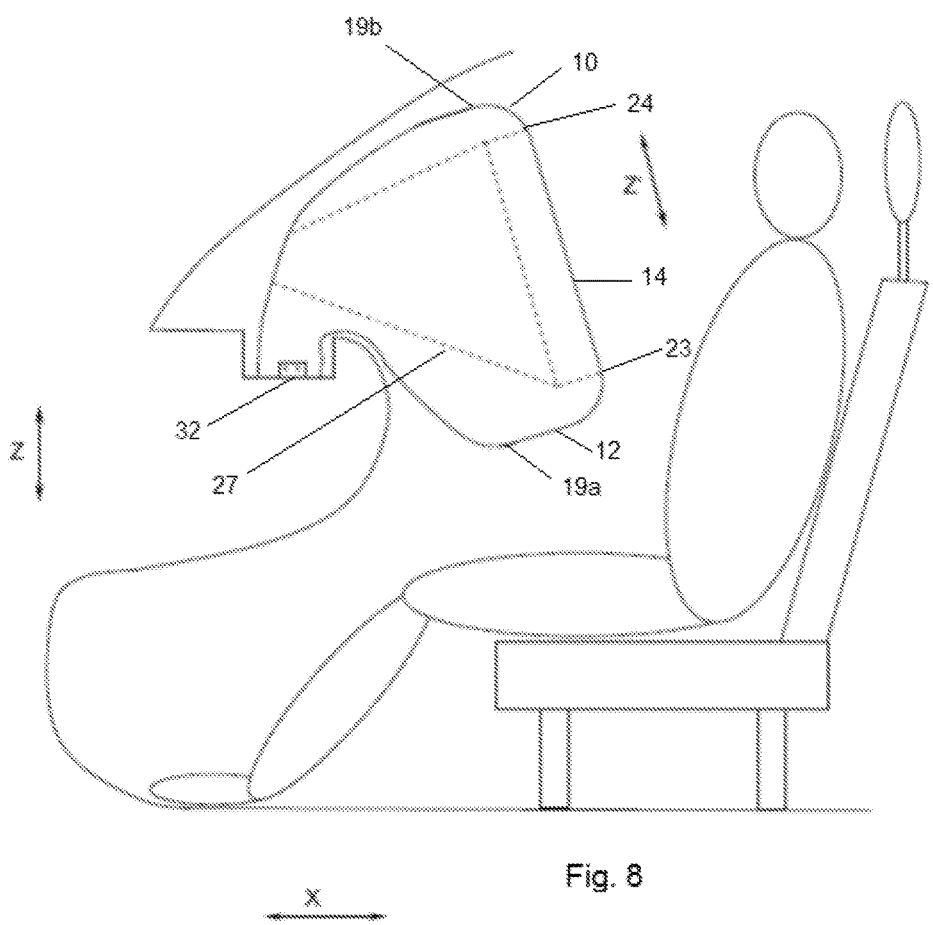
FIG. 8 shows a further variation of the first embodiment in a representation according to FIG. 1.
Figure 9:
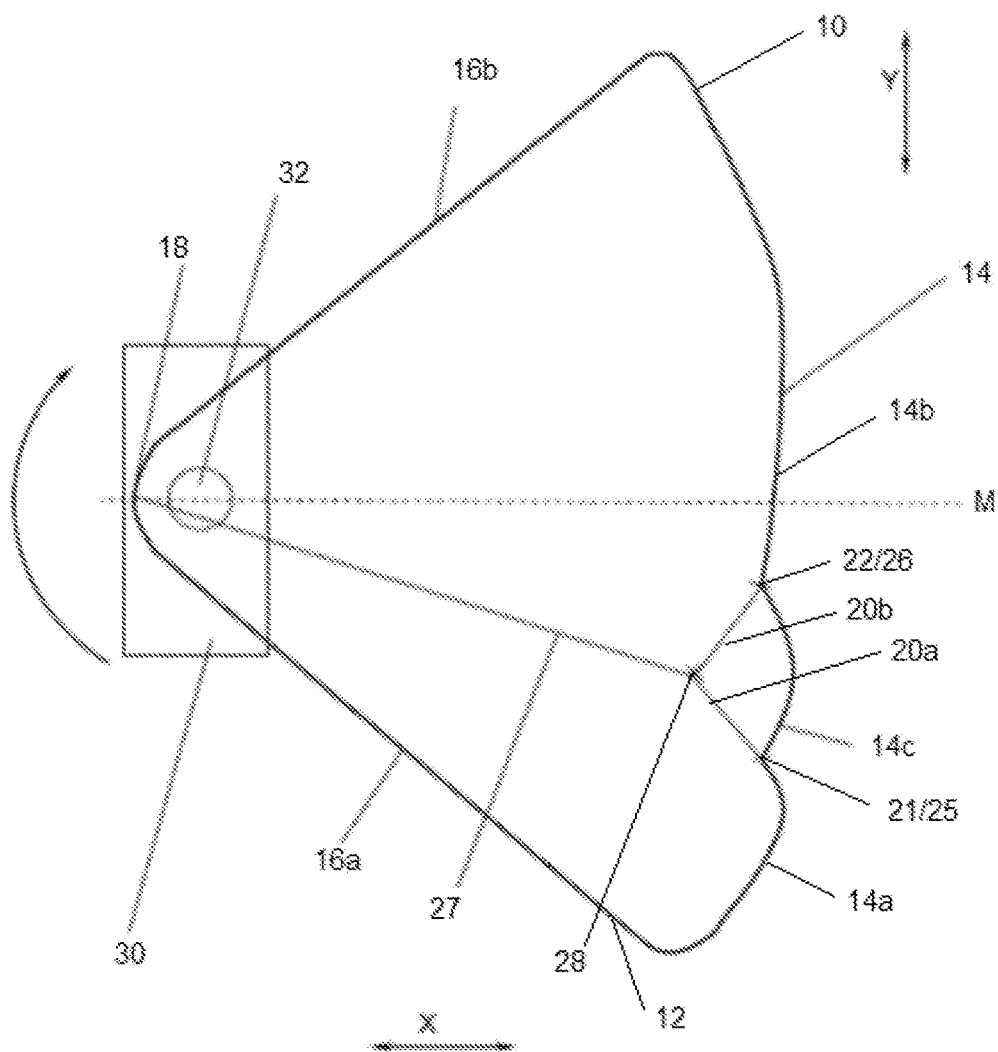
FIG. 9 shows what is shown in FIG. 8 in a representation according to FIG. 2.

FIGS. 8 and 9 show a further variation of the first embodiment shown in FIGS. 1 and 2. Here the outer skin 12 is wedge-shaped in the X-Y-plane, or in other, more general words: the width in Y-direction (second direction) decreases from the impact area 14 to the position of the housing 30. In the embodiment shown this decreasing is continuous but it could also be dis-continuous (in at least one step). The advantage of this shape is as follows. The softness of the "soft cell" (intermediate section 14c) has additional effects. Because of the softness, the head will immerge quite deeply into the impact area 14 and the head will then be partially encompassed and held by the first tether 14c and thus held in a position relative to the impact area. Because the wedged shape of the outer skin 12, the whole frontal airbag 10 will rotate around its attachment (often a part of the inflator 32 or to a separate attachment means adjacent to the inflator) in the X-Y-plane, basically in a direction as indicated by the arrow in FIG. 9, such that the head can "follow" the body in its movement towards the centre of the vehicle. So the force applied to the head a neck continues to be low. This special shape of the outer skin (decreasing width from the impact area towards the windscreen side end of the outer skin) can be applied to all other embodiments shown before (only one tether, first tether placed in the middle of the impact area).

Figure 10:
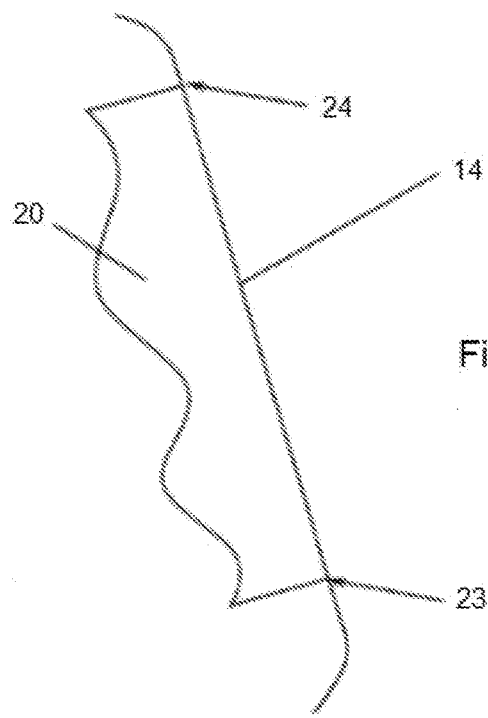
FIG. 10 is a detail view of FIG. 1 and, FIG. 11 shows a variation of what is shown in FIG. 10.
Figure 11:
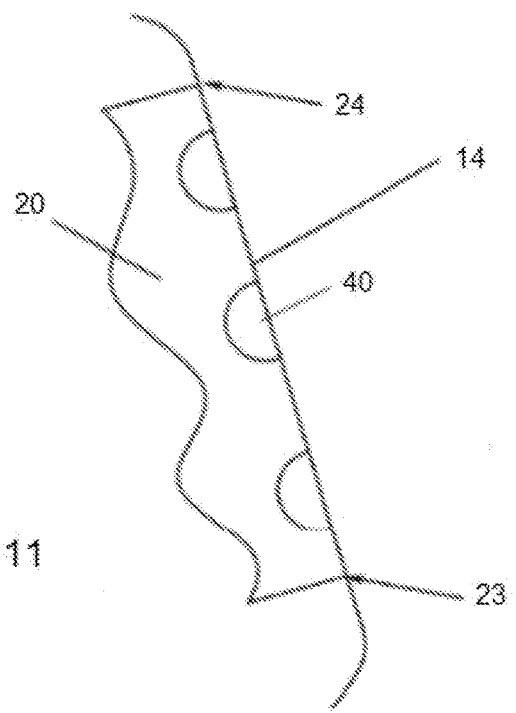

FIG. 10 shows a detail of FIG. 1, namely a connection between the first tether 20 and the impact area 14. Here the connections 25, 26 are uninterrupted connections, especially uninterrupted seams, but as can for example be seen from FIG. 11 this is not mandatory. It would also be possible to apply interrupted seams, for example by using a first tether with cut-in holes 40 at the side, to ensure that the part of the gas space behind the intermediate section is rapidly and completely filled with gas. Alternatively or additionally holes could be present remote from the ends 21, 22 of the first tether. This applies to all shown embodiments.

While the above description constitutes the preferred embodiment of the present invention, it will be appreciated that the invention is susceptible to modification, variation and change without departing from the proper scope and fair meaning of the accompanying claims.

The invention claimed is:

1. A frontal airbag for a vehicle occupant, the airbag having an outer skin enclosing a gas space comprising,
the outer skin forming an impact area positioned in front of the occupant and extending horizontally in a first direction and in a second direction perpendicular to the first direction when the airbag is fully deployed,
a first tether extending in the first direction from a first end being connected to the impact area at a first connection to a second end being connected to the impact area at a second connection, the first and second connections extending in the second direction from a lower end to an upper end thereof, such that an intermediate section of the impact area is spanned over by the first tether,
wherein the first tether is under tension when the airbag is fully deployed such that tension in the intermediate section of the impact area is reduced relative to the sections of the impact area adjacent to the intermediate section in the first direction, and
a second tether connected to the first tether between the first and the second connections.

2. The frontal airbag according to claim 1, furthering comprising the width of the intermediate section of the impact area exceeds the width of the first tether in the first direction.

3. The frontal airbag according to claim 1, further comprising in that the second tether extends from the first tether to a side or a vehicle-front area of the airbag outer skin or to a housing in which the airbag is stored prior to deployment.

4. The frontal airbag according to claim 1, further comprising in that the first and second connections extend in the second direction along at least 30%, or along at least 50%, or along at least 70% of a height of the impact area.

5. The frontal airbag according to claim 4, further comprising that the first and second connections extend substantially along the entirety of a height of the impact area.

6. The frontal airbag according to claim 1, further comprising in that the first connection and the second connection are equally long in the second direction.

7. The frontal airbag according to claim 1, further comprising in that the first and second connections are each continuous lines.

8. A frontal airbag according to claim 1, further comprising in that at least one of the first and second connections form at least one interruption.

9. The frontal airbag according to claim 1, further comprising in that the distance between the first and second connections in the first direction is between 10 cm and 30 cm.

10. A frontal airbag according to claim 1, further comprising in that the width of the outer skin decreases from the impact area towards a windscreen side area of the outer skin.

11. The frontal airbag according to claim 1, further comprising in that the intermediate section is in the first direction offset with respect to a middle of the impact area.

12. The frontal airbag according to claim 11, wherein the offset is toward a side of a vehicle having the frontal airbag.

13. A frontal airbag module comprising a housing, an inflator attached to the housing, and the frontal airbag according to claim 1, folded into the housing with the inflator being in fluid communication with the gas space being defined by the outer skin of the airbag.

14. The frontal airbag module according to claim 13, further comprising the frontal airbag module is a passenger-side frontal airbag module for attaching to an instrument panel of a vehicle.

15. A motor vehicle with the frontal airbag module according to claim 14, further comprising wherein the intermediate section is offset towards the middle of the vehicle.

16. The frontal airbag according to claim 1, wherein the second tether divides the first tether into two sections and is configured to place tension on the first tether.

17. The frontal airbag according to claim 1, wherein the second tether is connected to the first tether by an inter-tether connection and to the outer skin by a skin-tether connection.

* * * * *